United States Patent [19]
Feucht et al.

[11] 3,915,618
[45] Oct. 28, 1975

[54] APPARATUS FOR MAKING HOSE

[75] Inventors: Robert H. Feucht; Lawrence R. Jones, both of Cuyahoga Falls, Ohio

[73] Assignee: The Goodyear Tire & Rubber Company, Akron, Ohio

[22] Filed: Jan. 29, 1974

[21] Appl. No.: 437,542

Related U.S. Application Data

[62] Division of Ser. No. 225,262, Feb. 10, 1972, Pat. No. 3,813,313.

[52] U.S. Cl. .................. 425/503; 156/156; 425/505
[51] Int. Cl.² .................. B29H 5/28; B29H 7/14
[58] Field of Search ........... 425/501, 503, 505, 508, 425/509, 515; 156/156, 165, 203

[56] References Cited
UNITED STATES PATENTS

| | | | |
|---|---|---|---|
| 2,756,458 | 7/1956 | Krupp et al. | 156/203 X |
| 3,296,051 | 1/1967 | Harpfer et al. | 156/190 |
| 3,399,094 | 8/1968 | Skoggard et al. | 156/156 X |
| 3,427,638 | 2/1969 | Vukovich | 425/455 X |
| 3,664,783 | 5/1972 | Murray | 425/326 X |

FOREIGN PATENTS OR APPLICATIONS

| | | | |
|---|---|---|---|
| 396,401 | 6/1966 | Switzerland | 425/113 |

*Primary Examiner*—R. Spencer Annear
*Attorney, Agent, or Firm*—F. W. Brunner; R. P. Yaist

[57] ABSTRACT

A method and apparatus for making flexible reinforced hose in long lengths with the hose having a reinforcing section consisting of one or more circumferentially discontinuous or non-endless layers of reinforcing material including at least one longitudinally extending overlapped joint therein. The method includes providing at least one web of reinforcing material, applying one or more layers of flexible polymeric material to the web, folding the web to form an elongated tubular hose member with a longitudinal overlapped joint, moving the tubular member into a curing chamber of an elongated hollow curing apparatus, confining the tubular member exteriorly of the curing chamber prior to curing to prevent opening of the periphery of the member under conditions of inflation, inflating the tubular member prior to curing at least a length of the tubular member, cooling the cured length of the tubular member, deflating the cured length of the tubular member, advancing the cured length of the tubular member out of the curing apparatus, and repeating the above steps until the entire hose is cured. The apparatus includes an elongated hollow tubular curing apparatus including a curing chamber therein, means for carrying and supporting the hose components, means for moving the tubular member into the curing apparatus, means for confining an uncured length of the tubular member exteriorly of the curing chamber prior to curing, and means for inflating, cooling and deflating the tubular member and means for advancing the cured tubular member out of the curing apparatus. The method and apparatus of this invention are particularly useful for making long length water discharge hose.

12 Claims, 30 Drawing Figures

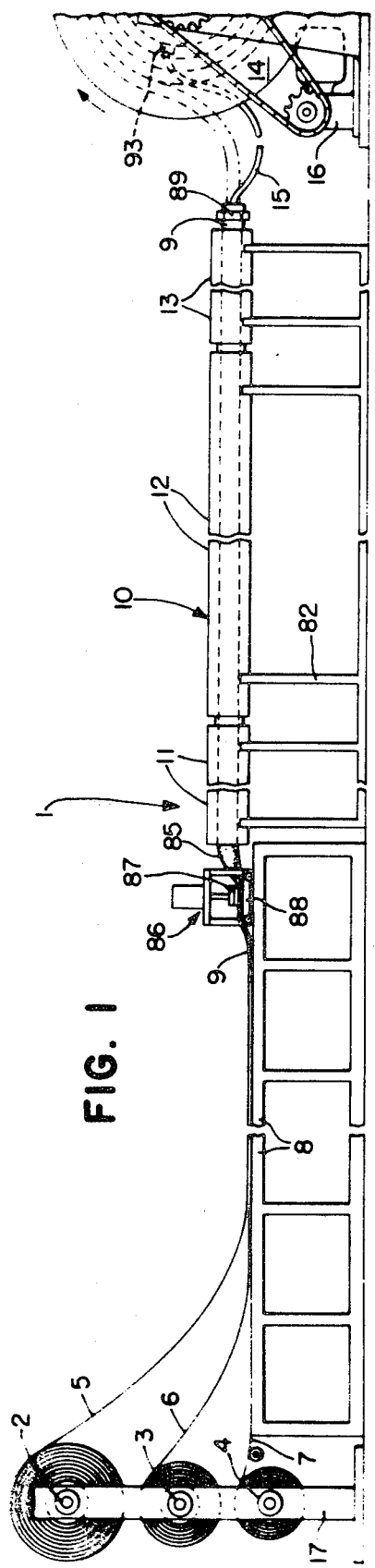
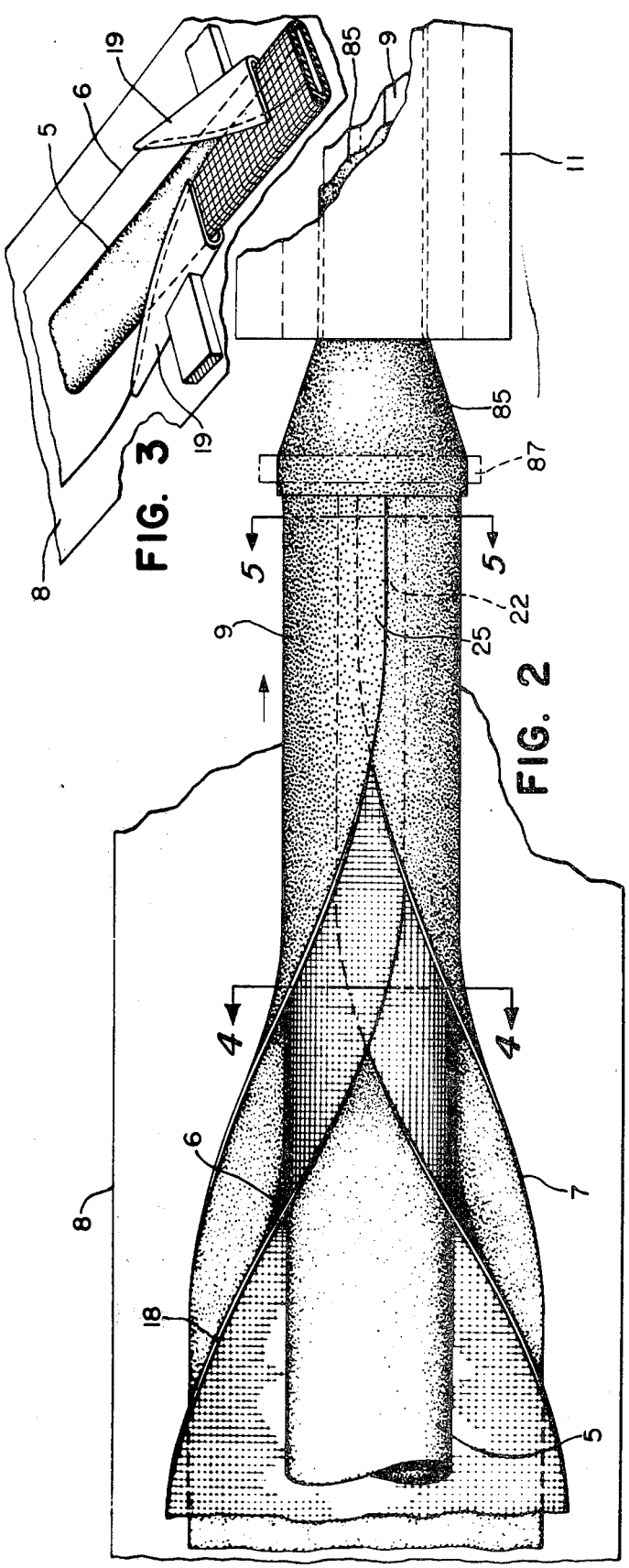

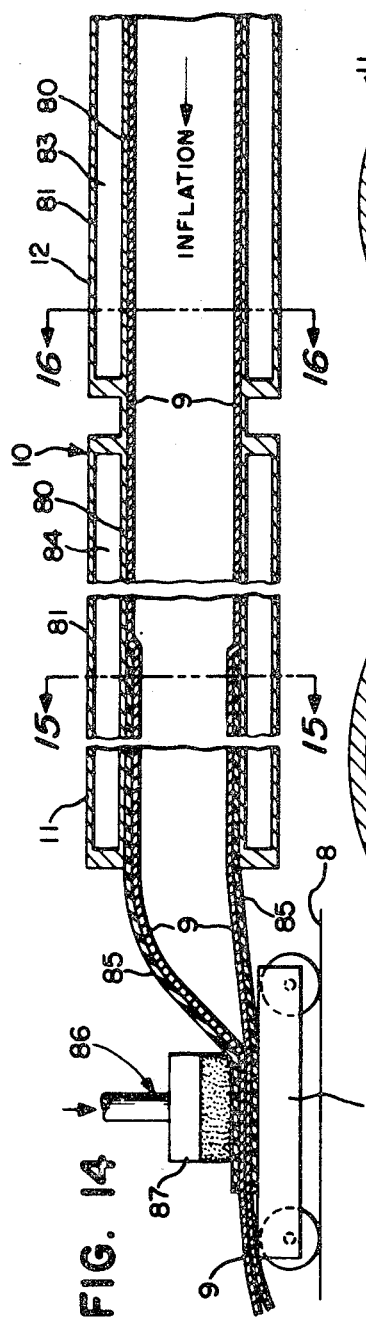
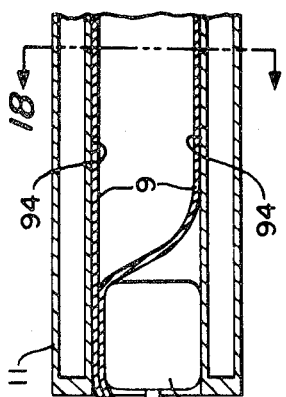
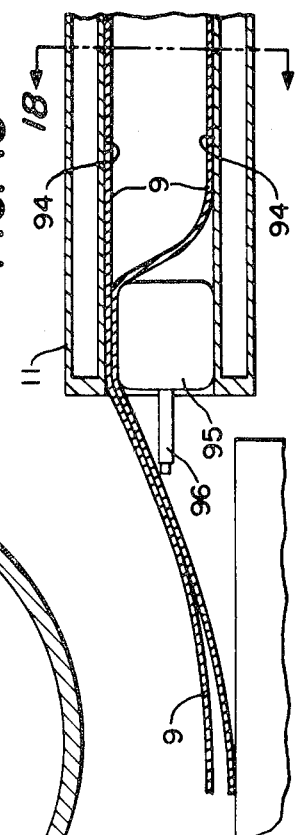
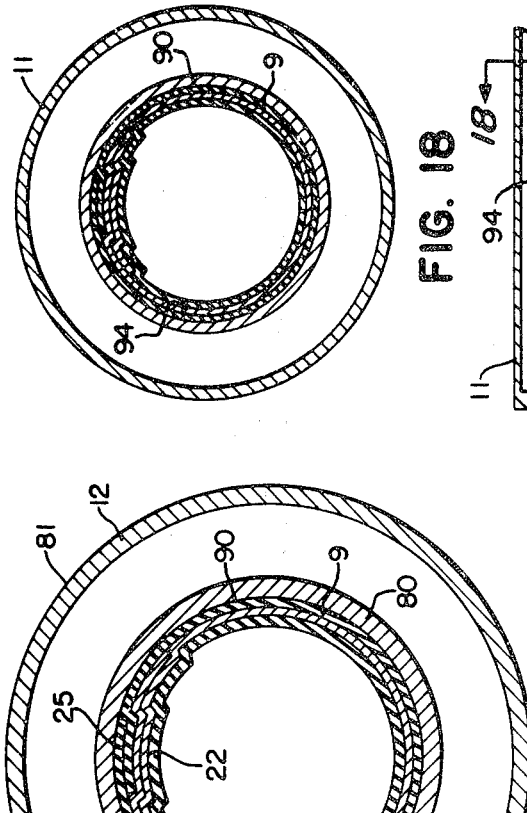
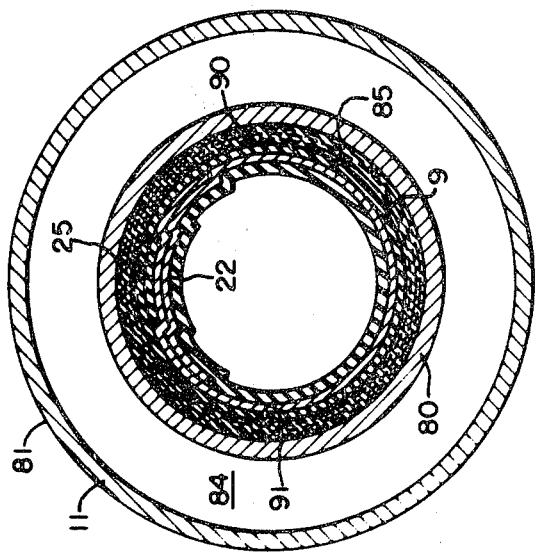

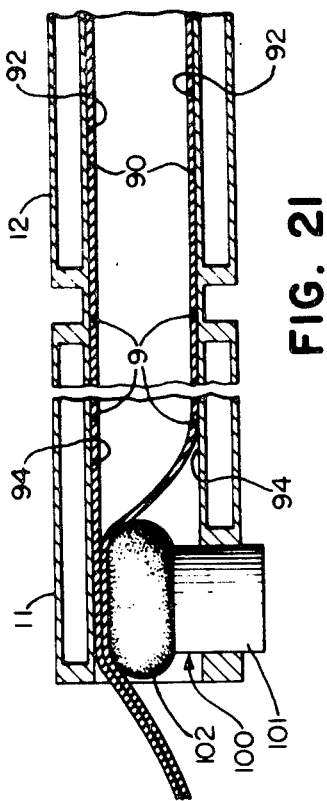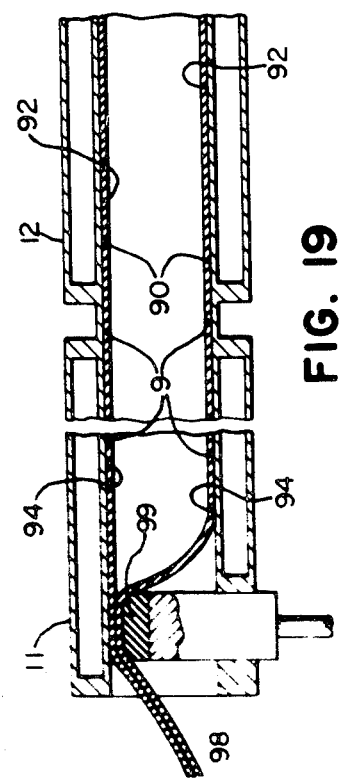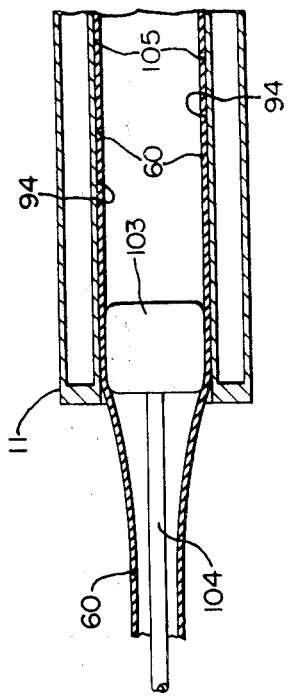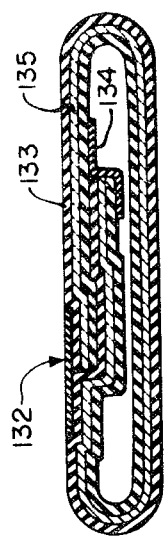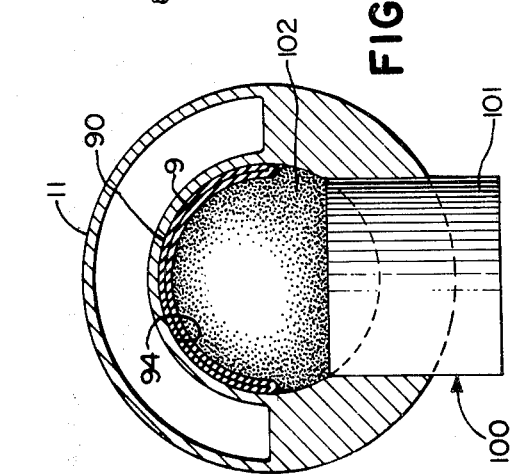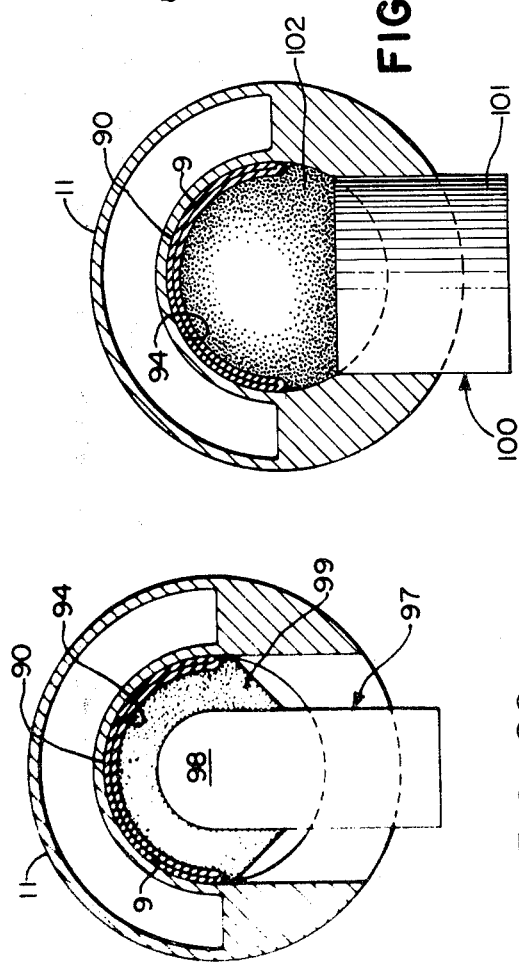

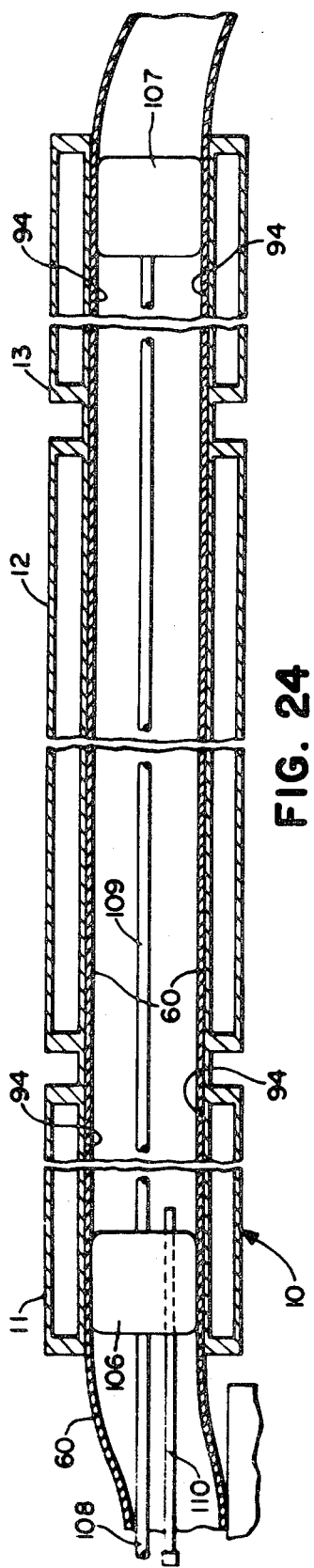
FIG. 24
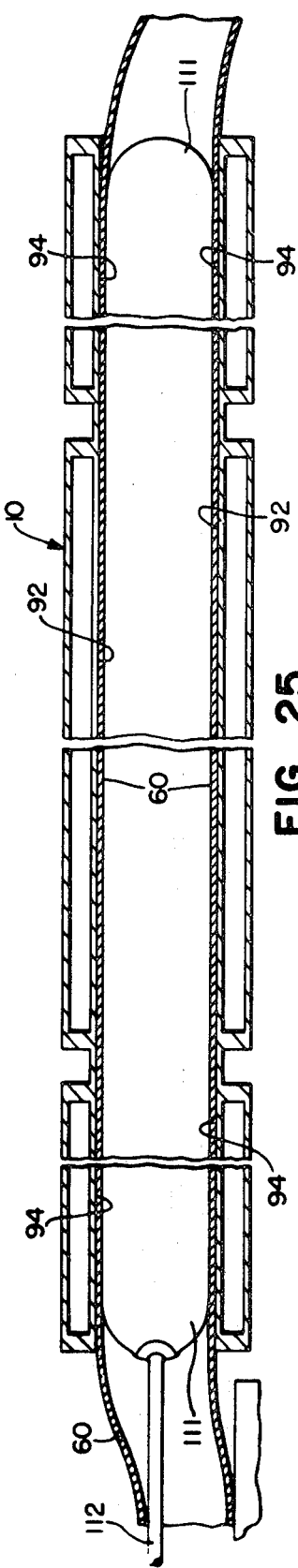
FIG. 25
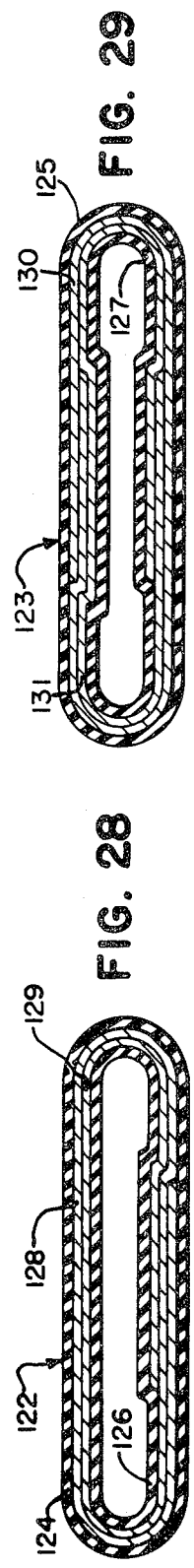
FIG. 26
FIG. 28
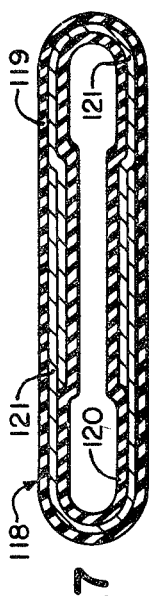
FIG. 29
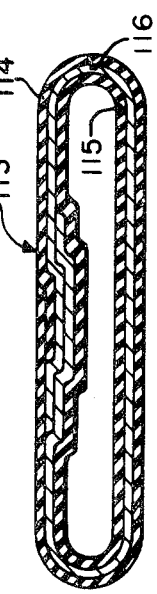
FIG. 27

APPARATUS FOR MAKING HOSE

This is a division of application Ser. No. 225,262 filed Feb. 10, 1972, now U.S. Pat. No. 3,813,313 issued on May 28, 1974.

BACKGROUND OF THE INVENTION

This invention relates to a method and apparatus for the making of flexible reinforced hose in long lengths. More specifically, this invention relates to a method and apparatus for making such hose having a reinforcing section consisting of one or more circumferentially discontinuous or non-endless layers of reinforcing material having at least one overlapped joint therein extending longitudinally of the hose.

Long length large diameter unspliced hose, particularly water and fuel discharge hose, normally include inner and outer layers of flexible polymeric material such as natural or synthetic rubber and a reinforcing section of textile fabric, fiber glass or metallic material in a circumferentially continuous or endless form (as viewed in cross-section) and of a woven, braided or spiraled construction. In conventional manufacturing methods, the inner hose layer or tube is usually extruded and may also be built on a mandrel and may or may not receive a precure or semi-cure treatment prior to the addition of the reinforcing material. A backing layer of unvulcanized elastomeric material may be applied to the outer periphery of the flexible tube and the reinforcing material in its desired circumferentially endless form is applied over and around the tube and backing. The outer hose layer or cover of flexible polymeric material is then applied over the outer periphery of the reinforcing material prior to cure.

The curing or vulcanizing of the hose takes place in a curing apparatus which is usually a hollow, tubular mold including a curing chamber heated by steam jackets incorporated in the cylindrical walls of the chamber. Curing of the hose takes place when the hose is inflated and the outer peripheral surface of the hose is forced against the inner peripheral surface of the curing chamber which is heated to effect the cure. In the conventional method of curing these long length hose of this type, the hose reinforcement in its circumferentially continuous, endless form, has sufficient strength even prior to cure to contain the inflation medium. Therefore, the portion of the hose not contained within the curing apparatus does not burst due to the internal pressure of the inflation medium. A detailed description of a method and apparatus for continuously making long length reinforced hose is given in U.S. Pat. No. 3,296,051 issued to D. E. Harpfer et al, and assigned to applicants' assignee.

The conventional methods of manufacturing long length hose have not been entirely satisfactory because of the expense involved due to the relatively high strength reinforcing material required in the manufacturing process and in addition, because of the special curing apparatus sometimes necessary to produce the long length unspliced hose. For example, heretofore it has not been possible to manufacture hose of this type with a circumferentially discontinuous or non-endless reinforcement of a longitudinally overlapped construction, which is less expensive than the circumferentially discontinuous type reinforcement discussed above, since this circumferentially discontinuous, longitudinally overlapped type construction has not been of sufficient strength prior to cure to prevent opening under conditions of inflation of the uncured hose portion not being contained within the curing chamber.

The present invention, as will become apparent hereinafter, provides a method and apparatus for making long length hose having circumferentially discontinuous, longitudinally overlapped reinforcement.

OBJECTS OF THE INVENTION

It is a primary object of the present invention to provide an economical method of making flexible reinforced hose in a single long length to eliminate the use of couplings or splices to obtain this long length.

It is another primary object of the present invention to provide a method and apparatus for making flexible reinforced hose in long lengths in which the hose reinforcing section consists of one or more circumferentially discontinuous, non-endless layers of reinforcing material having at least one overlapped joint therein.

It is another important object of the present invention to provide a method and apparatus for making long length reinforced hose in which the reinforcement is confined exteriorly of the curing chamber of the curing apparatus prior to cure.

Other objects and advantages of this invention will become apparent hereinafter as the description thereof proceeds, the novel features, arrangements and combinations being clearly pointed out in the specification as well as the claims thereunto appended.

In accordance with the present invention, the above-named objects are accomplished by a method of making flexible reinforced hose in long lengths with the hose having at least an inner layer of flexible polymeric material and a reinforcing section consisting of one or more circumferentially discontinuous layers of reinforcing material surrounding the inner layer and having at least one overlapped joint therein extending longitudinally of the hose. The method comprises the steps of (a) providing at least one web of reinforcing material to form the reinforcing section of the hose; (b) applying one layer of flexible polymeric material to the inner surface of the web which will form at least a portion of the inner layer of the hose to be made: (c) folding at least one said web to form an elongated tubular member with at least one overlapped joint of substantial width extending longitudinally thereof with the tubular member comprising at least a portion of the hose to be made; (d) moving said tubular member including said inner layer of flexible polymeric material into an elongated, hollow, tubular curing apparatus with the apparatus having an elongated curing chamber for curing the hose; (e) confining an uncured length of the tubular member within a confining means exteriorly of the curing chamber prior to curing to substantially enclose the periphery of the tubular member so as to prevent opening thereof under conditions of inflation; (f) inflating the tubular member prior to curing to cause the outer peripheral surface of the tubular member to conform to the inner peripheral surface of the curing chamber; (g) curing at least a length of the tubular member in said curing chamber to form a cured portion of the hose with a fixed circumference; (h) cooling the cured length of the tubular member after curing; (i) deflating the cured tubular member; (j) advancing the cured tubular member out of the curing apparatus; and if necessary (k) repeating the steps of providing, applying, folding, moving, confining, inflating, curing, cooling, deflating and advancing until the entire hose length is cured to form a unitary composite structure.

It has also been found that the above-named objects are accomplished by providing an apparatus for making hose of the type described with the apparatus comprising in combination: (a) an elongated, hollow tubular curing apparatus including an elongated curing chamber for curing the hose; (b) means adjacent to the entrance of the curing apparatus for carrying and supporting at least one web of reinforcing material to form the reinforcing layers of the hose, and a layer of flexible polymeric material to form the inner layer of at least a portion of the hose with said web being folded to form an elongated tubular member with at least one overlapped joint of substantial width extending longitudinally thereof with the tubular member comprising at least a portion of the hose to be made; (c) means for moving the tubular member into the curing apparatus; (d) means for confining an uncured length of the tubular member exteriorly of the curing chamber prior to curing to substantially enclose the periphery of the tubular member so as to prevent opening thereof under conditions of inflation; (e) means for inflating the tubular member prior to curing to cause the outer peripheral surface of the tubular member to conform to the inner peripheral surface of the curing chamber; (f) means for cooling the cured length of said tubular member; (g) means for deflating the tubular member; and (h) means for advancing the cured tubular member out of the curing apparatus.

BRIEF DESCRIPTION OF THE DRAWINGS

In the drawings:

FIG. 1 is an overall side elevational view of the apparatus of the invention used in making hose by the method of the invention;

FIG. 2 is an enlarged fragmentary top elevational view of a portion of the apparatus shown in FIG. 1 illustrating one method of folding the web of hose reinforcing material and applying the layer of flexible polymeric material to the reinforcing material;

FIG. 3 is a fragmentary perspective view illustrating a device for folding the web of hose reinforcing material shown in FIG. 2;

FIG. 14 is an enlarged sectional view showing a portion of the apparatus of FIG. 1, including the confining means and curing apparatus of the invention, illustrating the method and means by which a tubular member of the hose is confined prior to cure;

FIG. 15 is a sectional view taken on line 15—15 of FIG. 14;

FIG. 16 is a sectional view taken on line 16—16 of FIG. 14;

FIG. 17 is a modification of the invention shown in FIG. 14;

FIG. 18 is a section taken on line 18—18 of FIG. 17;

FIGS. 19, 20, 21 and 22 are alternate forms of the invention shown in FIG. 17;

FIGS. 23, 24 and 25 are fragmentary side elevational views illustrating modifications of the invention shown in FIGS. 14 and 17;

FIG. 26 is an enlarged sectional view illustrating the cross-section of the cured hose structure made by the apparatus and method of this invention; and FIGS. 27, 28, 29 and 30 are modifications of the hose structure shown in FIG. 26 made by the folding methods as illustrated in FIGS. 8, 7, 9 and 12 respectively.

DESCRIPTION OF THE PREFERRED EMBODIMENTS

Figure 4:
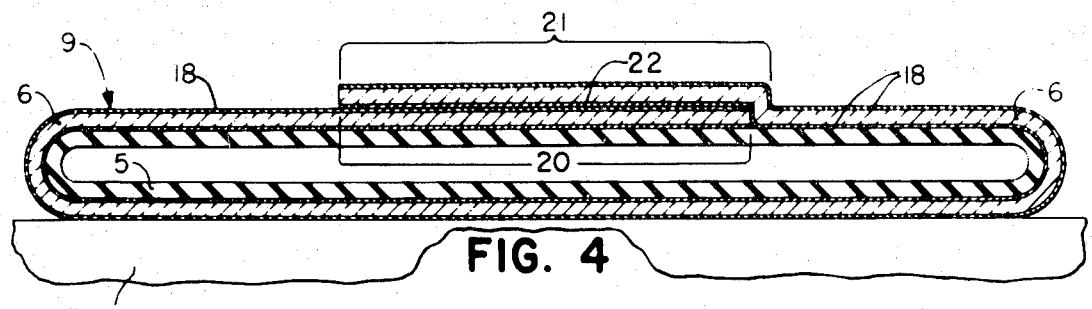
FIG. 4 is an enlarged sectional view taken on line 4—4 of FIG. 2.

In FIG. 1 the hose-making apparatus of this invention used to manufacture long length reinforced unspliced hose is shown and is generally designated by numeral 1. The apparatus 1 includes means for carrying the structural components of the hose to be made, such as stock let-off devices 2, 3 and 4 containing the hose components 5, 6 and 7 preferably in rolled or coiled form, and a table 8 for carrying and supporting the hose components 5, 6 and 7 upon which hose portions 9 are formed into a tubular configuration from the hose components prior to cure. The apparatus 1 further includes a curing or vulcanizing apparatus denoted generally by 10 which is used to cure the tubular hose portions 9 thus formed under heat and pressure. The curing apparatus 10 includes a confining or cooling chamber 11 at the entrance of the curing apparatus, a curing chamber 12 and a confining or cooling chamber 13 at the exit of the curing apparatus. Means hereinafter described is provided for confining the formed tubular hose portions prior to cure exteriorly of the curing chamber 12. In addition, a hose winding reel 14 upon which the cured hose is wound after cure is also provided. Means 15 for inflating the hose portions 9 prior to cure and deflating the hose portions 9 after cure and means 16 for driving the reel are also included in the apparatus 1. The particular apparatus and method illustrated, for example, may be used for manufacturing 4-inch diameter water discharge hose in lengths of 600 feet or more. The hose made by the method and apparatus, for example, may be used for irrigation purposes.

As shown in FIGS. 1 and 2, the stock let-off 2 supported by a stand 17 contains a tube 5 of flexible polymeric material. The tube carrying let-off 2 is disposed generally in alignment with the table 8 and is spaced from the curing apparatus 10. The tube 5 which forms the inner layer of the finished cured hose is usually extruded but may also be mandrel built and it may be provided in cured, uncured or semi-cured condition as contained in the stock let-off 2. The tube 5 is preferably composed of extrudable, formable elastomeric material such as natural or synthetic rubber or flexible plastic material such as polyvinyl chloride. In producing water discharge hose the tube, for example, may be composed of a styrene butadiene elastomer.

The let-off 3 disposed below the let-off 2 also supported by the stand 17 contains a continuous sheet or web 6 of reinforcing material. The web 6 is preferably composed of a woven textile fabric such as cotton, nylon, rayon or polyester or combinations thereof but may also be composed of such materials as fiber glass or metal. The web 6 includes a thin layer or coating 18 of an uncured elastomeric material provided in a thin frictioned coat preferably applied to both faces or sides of the web 6. The uncured elastomeric material is usually applied by calendering and impregnates the material of the web 6. The reinforcing material of the web 6 preferably is composed of polyester or a combination of polyester and nylon fabric having a thickness of about 0.050 of an inch. The reinforcing web 6 is preferably "cut on the straight" or in other words, is composed of warp elements extending parallel to the longitudinal axis of the hose rather than being "bias cut" which would require splicing pieces of the reinforcing web 6 together end-to-end in order to provide the necessary long lengths. The web 6 when folded as will be hereinafter described, forms the reinforcing section of the finished hose. Of course, it is to be understood that more stock let-off devices can be provided if more than one web of reinforcing material is required.

Preferably a stock let-off 4 disposed below the let-off 3 and supported by the stand 17 is also provided containing a rolled continuous sheet 7 of flexible polymeric material to form the cover or outer layer of the hose. The outer layer is preferably formed of an abrasion and weather-resistant material such as a blend of nitrile rubber and polyvinyl chloride. The sheet 7 may be in a cured, uncured or semi-cured condition and has a thickness, for example, in the range of from about 0.040 of an inch to about 0.075 of an inch. It should, however, be realized that the stock let-off 4 is only necessary if it is desired that the finished hose include a separate outer polymeric layer which is normally the case.

In one preferred method of forming the hose portions 9 prior to curing, the tube 5 is provided in a length approximately equal to the length of the hose to be made and has any desired wall thickness depending upon the particular use intended. For example, in making long length water discharge hose, the tube may have a wall thickness of from about 0.050 to about 0.075 of an inch. The web 6 is also cut to the approximate length of the finished hose and at a greater width than the circumference of the tube 5. For example, the web 6 may be provided in a width of 16 inches if the circumference of the tube 5 is 13 inches.

In forming the tubular hose portion 9, the web 6 is first pulled from the let-off 3 either manually or by mechanical means and is laid out to full width on the surface of the table 8. The tube 5 is also pulled from the let-off 2 manually or mechanically and positioned essentially in the center of the web 6 and the web 6 is wrapped around the tube 5 either by hand or by means of a suitable folding device 19 which may be mounted on the table 8 as best shown in FIG. 3. The longitudinally extending lateral edge portions 20 and 21 of the web 6 are folded so, as best shown in FIG. 4, one lateral portion 20 is superposed over the other lateral edge portion 21 to form the tubular hose member 9. An overlapped joint 22 of substantial width is created at the juncture of the edge portions 20 and 21 which extends longitudinally of the tubular hose 9. Preferably the joint 22 is stitched together, for example, by means of a roller (not shown) as is well-known in the art. The overlapped joint 22 of the water discharge hose of the type described having an inside diameter of 4 inches, for example, should be from about 2 inches to about 4 inches. The reinforcing web 6 then is of a circumferentially discontinuous, overlapped construction as can best be seen in FIGS. 2 and 3. The thin coating 18 of uncured elastomeric gum contained on the surface of the web 6 provides a means of adhesion between the web 6 and the outer peripheral surface of the tube 5 and will act to adhere the lateral edge portions 20 and 21 of the web 6 together at the overlapped joint 22. It may also be desirable to apply a suitable adhesive or solvent wash to the contacting surfaces of the overlapped joint 22 in order to provide the necessary minimum adhesion to maintain the generally tubular shape of the hose components 5 and 6 during subsequent hose-making procedures.

If an outer layer or cover is desired, the continuous sheet 7 of polymeric material of the approximate length of the finished hose is first pulled from the let-off 4 onto the surface of the table 8. Then the web 6 is pulled from the let-off 3 over the sheet 7 and the tube 5 is pulled from the let-off 2 and positioned in the center of the web 6. The web 6 is folded over the tube 5 as described above to form the tubular member 9. Next, the sheet 7 is wrapped around the outer peripheral surface of the folded web 6 to form the outer peripheral surface of the tubular member 9. One longitudinally extending lateral edge portion 23 of the sheet 7 is superposed over the other longitudinally extending lateral edge portion 24 to form an overlapped joint 25 extending longitudinally of the tubular member 9 and disposed outwardly from the overlapped joint 22 formed by folding the web 6. The sheet 7 may be folded either by hand or by means of a suitable device, for instance, of the type shown in FIG. 3. As in the case of the joint 22, the joint 25 is also preferably stitched together by conventional means well-known in the art. The joint 25 holds sheet 7 together in a tubular configuration and the coating 18 will provide the necessary minimum amount of adhesion between the folded web 6 and the folded sheet 7 after cure.

Since the overlapped longitudinal joint 25 formed in the sheet 7 need not be of as great a width as in the case of the overlapped joint 22 in the folded reinforcing web 6, the width of the sheet 7 need not be as great as the width of the web 6. The sheet 7, for example, may be of a width of about 15 inches and the width of the overlapped joint 25 of the sheet 7 may be about 1 inch. The tubular member 9 should be of a length equal to or greater than the length of the curing apparatus 10 in which it will be formed. The tubular member 9 formed as described above is best seen in FIG. 5 (after cure, as will be hereinafter described, the finished hose made by curing one or more tubular hose portions has a cross-section as shown in FIG. 26).

Figure 6:
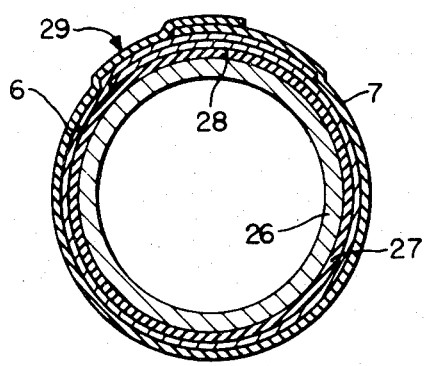
FIG. 6 is an enlarged sectional view illustrating a modification of the apparatus shown in FIG. 2.

As shown in FIG. 6, a mandrel 26 may replace the table in the hose-making apparatus and the tube 27 may be built in a conventional manner by overlapping a sheet of flexible polymeric material around the mandrel to form a longitudinally extending overlapped joint 28 as previously described or by wrapping a strip of polymeric material spirally around the mandrel 26. Thereafter, the web 6 and the outer layer or sheet 7 are folded in turn as described above to form the tubular member 29.

Figure 7:
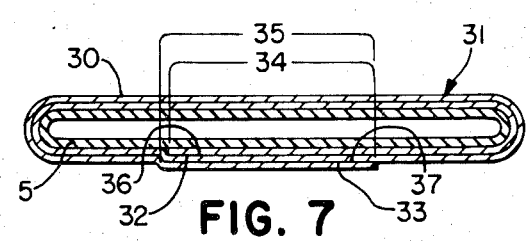
FIGS. 7, 8 and 9 are modifications of the invention shown in FIG. 4 illustrating various methods of folding the reinforcing web.

FIG. 7 illustrates another method of folding the web in which a web 30 of extra width is wrapped around a tube 5 for two turns to form two layers of reinforcement for the hose. The tubular member 31 formed by this method has two overlapped longitudinally extending joints 32 and 33 where the longitudinally extending lateral edge portions 34 and 35 of the web come into contact with intermediate surfaces 36 and 37 of the web 30. For example, the overlapped joint 32 is formed where an intermediate surface 36 of the web 30 comes in contact with the lateral edge portion 34 and another overlapped joint 33 is created where the lateral edge portion 35 is positioned over the intermediate surface 37 of the web 30 (the hose product resulting from this method after application of an outer cover layer to surround the folded web and after curing of the tubular hose member thereby formed is shown in FIG. 28). It should be apparent that the web 30 may be wrapped around the tube 5 for a plurality of turns to form any desired number of layers of reinforcing material for the hose.

Figure 8:
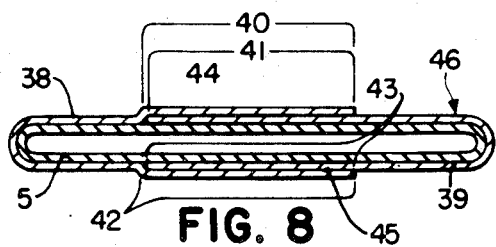

As illustrated in FIG. 8, two webs 38 and 39 of reinforcing material may be provided to form the layers of the reinforcing section of the hose. The webs 38 and 39 are wrapped around the tube 5 with a first longitudinally extending lateral edge portion 40 of the web 38 being superposed over a first longitudinally extending lateral edge portion 41 of the web 39 and a second longitudinally extending lateral edge portion 42 of the web 38 being superposed over a second longitudinally extending lateral edge portion 43 of the web 39 to form two overlapped joints 44 and 45 of substantial width extending longitudinally of the tubular member 46. It is preferred that the webs 38 and 39 are folded so that the overlapped joints 44 and 45 of substantially equal width are disposed on diametrically opposite sides of the tube 5 so that after application of an outer cover layer of flexible polymeric material to the folded webs 38 and 39, the cured hose product will have a balanced symmetrically reinforeced construction (as is shown in FIG. 27).

Figure 9:
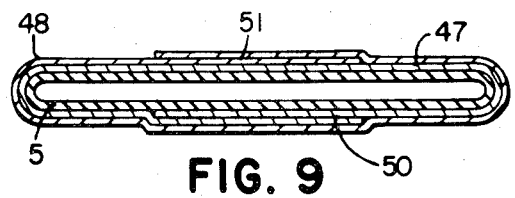

FIG. 9 illustrates that the fabric web can be folded to provide two plies or layers of reinforcing material in the reinforcing section of the finished hose. In this method two webs 47 and 48 are also used to form the tubular member 49 and the method includes wrapping one web 47 completely around the tube 5 to form an overlapped joint 50 in a manner previously described in regard to FIG. 4 and wrapping another web 48 around the web 47 to form another overlapped joint 51. Preferably an outer layer of flexible polymeric material is applied to cover the outer peripheral surface of the folded web 47 and 48 prior to curing the hoseproduced by this method (see FIG. 29).

Figure 5:
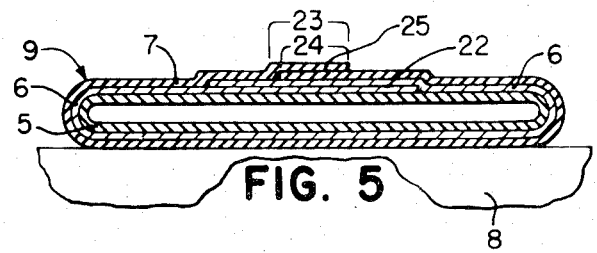
FIG. 5 is an enlarged sectional view taken on line 5—5 of FIG. 2.
Figure 10:
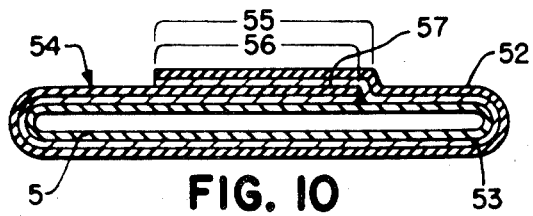
FIGS. 10, 11, 12 and 13 are modifications of the invention shown in FIGS. 4 and 5 illustrating various methods of applying the layers of flexible polymeric material to the reinforcing web.

In FIG. 10, a modification is shown in which the outer layer of the tubular member, rather than being applied as illustrated in FIG. 5, is formed instead by applying a flexible polymeric material to the outer face of the reinforcing web. This is accomplished by adhering the layer 52 to the web 53, for example, by means of a calendering operation performed prior to building or forming the tubular member. The layer 52 is applied to the web 53 in the desired thickness of the outer hose cover of the finished hose. The calendered web 53 having the outer layer 52 of flexible polymeric material adhered thereto may then be formed into a roll in a conventional manner with a suitable lubricant being applied to prevent the adherence or sticking together of the polymeric surfaces of the layer 52 and subsequently placed in the stock let-off device 3. Of course, this method eliminates the necessity of providing a separate stock let-off device such as 4 for the sheet of flexible polymeric material which forms the outer layer of the hose. In forming the tubular member 54 the web 53 may then be folded around the tube 5 with one longitudinally extending lateral edge portion 55 of the web overlapping the other longitudinally extending lateral edge portion 56 to form an overlapped longitudinal joint 57 in a manner as previously described.

Figure 11:
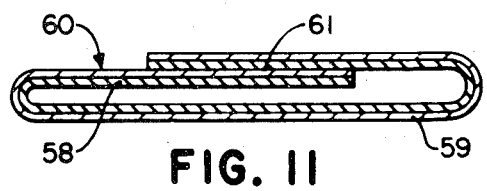

It is also possible, as illustrated in FIG. 11, that rather than a tube of flexible polymeric material, a layer of such material may be applied in the desired thickness to the inner face of the reinforcing web, for example, by calendering and thereby adhering the layer 58 to the web 59 prior to the hose building operation and then folding the laminated web to form the tubular member 60 having an overlapping longitudinal joint 61 in a similar manner as described in regard to FIG. 10. In this case, of course, there would be no need for the stock let-off 2 containing the flexible polymeric tube as shown in FIG. 1.

Figure 12:
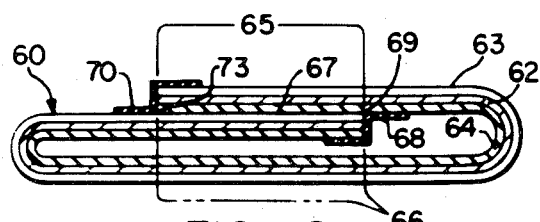

FIG. 12 illustrates that both the inner layer and the outer layer may be applied in the desired thickness to the inner and outer faces respectively of the web prior to the building operation in which the tubular member 60 is formed. In this case a coating or layer of flexible polymeric material is adhered to both faces of the reinforcing web 62, for example, by calendering to thereby form a laminated web of reinforcing material having an outer layer 63 and an inner layer 64 adhered to the web 62. The web 62 is then folded with one lateral edge portion 65 of the web 62 being superposed over another lateral edge portion 66 to form an overlapped longitudinal joint 67. In addition, before the web 62 is folded to form the joint 67, preferably an inner seaming or sealing strip 68 is positioned to cover the longitudinally extending inner edges 69 of the joint 67. The strip 68 is desirable to prevent wicking of fluid substances being carried by the hose through the reinforcing material. An outer seaming or sealing strip 70 of flexible polymeric material may also be positioned to cover the longitudinally extending edges 73 of the joint 67. These strips 68 and 70 may be part of the coating material applied during the calendering operation or separate strips applied subsequently. The strips 68 and 70 may also be provided in the embodiments shown in FIGS. 10 and 11. After curing a unitary composite hose structure of flexible polymeric material and reinforcing material is formed having an outer layer, an inner layer and a reinforcing layer disposed therebetween (as shown in FIG. 30).

Figure 13:
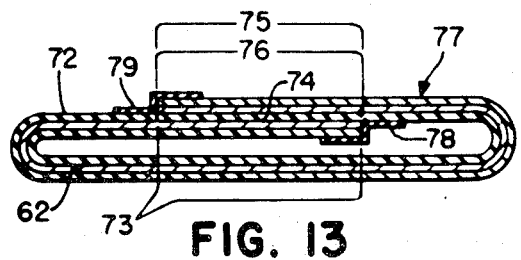

In another method of applying the flexible polymeric layers to the reinforcing web 62 illustrated in FIG. 13, one layer 72 of flexible polymeric material is adhered to cover all but a surface portion 73 of a face of the web 62. This surface portion 73 should have a width and length corresponding at least generally to the width and length of the overlapped joint 74 desired. Therefore during the folding step the uncoated surface portion of one lateral edge portion of the web is joined to the coated surface portion of the other lateral edge portion of the web so that one of the edge portions 75 is in overlying relationship to the other edge portion 76 whereby a single layer thickness of polymeric material is provided at the joint 74 between the reinforcing material of the web 62 when the tubular member 77 is formed. This method provides the advantage of elininating the necessity of the stock let-offs 2 and 4 for containing the tube and cover components 5 and 7 respectively. In addition, inner and outer seaming strips 78 and 79 respectively are applied in the same manner as described with reference to FIG. 12.

The curing apparatus 10 of the invention, as best shown in FIG. 14, comprises elongated hollow, coaxially arranaged concentric cylindrical steel pipes or tubes 80 and 81 disposed adjacent to the table 8 and mounted on supporting structure 82. The apparatus 10 includes a curing chamber 12 in which the tubular hose member 9 is cured. The curing chamber 12 has an annular chamber 83 around the outer periphery of the inner pipe 80 which serves as a steam jacket and the outer pipe 81 is covered with an insulating material to conserve heat. The curing chamber 12 may be of any desired length within practical limits dictated by the facilities of the manufacturer. For example, a curing chamber of 20 feet has proven to be efficient in curing long length unspliced hose. The apparatus preferably also includes hose confining means such as unheated confining chambers 11 and 13 (FIG. 1) which also function in this instance as cooling chambers disposed adjacent to the curing chamber 12 on either end thereof. One confining chamber 11 is disposed at the entrance of the apparatus 10 immediately adjacent and in alignment with the end of the table 8 and another confining chamber 13 is disposed at the exit of the apparatus 10. The confining or cooling chambers 11 and 13 include an annular chamber 84 or jacket around the outer periphery of the inner pipe 80 through which a cooling liquid such as water is circulated. The outer pipe 81 is also covered with a suitable insulating material. The length of the cooling chambers 11 and 13 may vary but usually are about 4 feet when used with a curing chamber of a length of about 20 feet. Of course, the curing chamber 12 and confining chambers 11 and 13 have an inside diameter comparable to the desired outside diameter of the cured hose.

As mentioned previously, it is required that the circumferentially discontinuous or non-endless, overlapped reinforcing layers of the tubular member 9 be contained or confined exteriorly of the curing chamber 12 prior to vulcanization or curing to substantially enclose the periphery of the tubular member 9 to prevent opening thereof under conditions of inflation. This is required since the circumferentially discontinuous overlapped construction does not have sufficient strength to withstand the internal pressures caused by the introduction of inflation medium in the portion of the tubular member 9 located outside of the tubular confines of the curing chamber 12. Unlike the case of reinforcement having a circumferentially continuous or endless woven, braided or spiral construction, the uncured overlapped joints 22 and 25 of the tubular member 9 will burst when subjected to internal pressures prior to vulcanization.

One means of confining the tubular member 9 is illustrated in FIG. 14. A tubular sleeve 85 of reinforced flexible resilient material, for example of fabric-reinforced vulcanized elastomeric material, is disposed within the entrance of the curing apparatus 10 within the confining or cooling chamber 11. The sleeve 85 has a greater inner diameter than the outer diameter of the tubular member 9 which it will contain and has a circumference no greater than the circumference of the confining chamber 11. The sleeve can be of various dimensions, for example, the sleeve may be about 3 feet long with a wall thickness of about three-sixteenth of an inch. In operation, the sleeve, for instance, may be inserted into the 4 foot long chamber 11 for a distance of from about 12 to about 18 inches.

In the method of confining the tubular member 9, the first portion of the hose which has been formed into a tubular member 9 having approximately the length of the curing chamber 12, is moved through the bore of the sleeve 85 and through the confining or cooling chamber 11, the curing chamber 12 and the cooling chamber 13 so that the forward end of the tubular member 9 extends beyond the exit of the curing apparatus 10. This can be accomplished, for instance, by attaching one end of an elongated element such as a rope (not shown) to the forward end of the tubular member 9 in its position on the table 8 and attaching the other end of the rope to the motorized hose reel 14.

A clamping member 86 is provided exteriorly of the cooling chamber 11 to seal the end of the sleeve 85 and tubular member 9 which extends outwardly from the entrance of the curing apparatus 10. The clamping member 86 may be any one of several types well known in the art, for example a pneumatically operated mechanical clamp as illustrated in FIG. 14 or any other type of pneumatically, hydraulically or mechanically actuated device. A pneumatic air bag of flexible material may also be used for this same purpose.

In the apparatus illustrated, the clamping member 86 has a vertically movable upper part 87 and a stationary lower part 88 with the entire clamping member being movably mounted to ride along the surface of the table 8. The clamping member 86 provides a seal acting externally of the tubular member 9 by forcing or compressing the tubular wall of the sleeve 85 and the tubular member 9 contained therein together between parts 87 and 88 of the clamping member. The clamping member parts 87 and 88 each preferably include a facing of resilient material on the surface which comes in contact with the sleeve 85 to thereby prevent undue abrasion or damage to the sleeve 85 or tubular member 9 contained within the sleeve.

In curing the hose, the first portion of the uncured tubular member 9 is moved into the curing apparatus 10 and a portion is allowed to extend through the cooling chamber 13 disposed in the exit of the apparatus 10 with a coupling 89 being provided to seal this extending end portion. Means 15 is provided connected to the coupling 89 for introducing air or other inflation medium into the tubular member 9 now sealed at both ends. If desired, an additional sleeve (not shown) may be provided in the confining or cooling chamber 13 at the exit of the curing apparatus 10 which will act to confine a portion of the tubular member 9.

As best seen in FIG. 15, the sleeve 85 acts to confine at least a portion of the tubular member 9 exteriorly of the curing chamber 10 and the peripheral outer surface 90 of the tubular member 9 is confined within the inner peripheral surface 91 of the sleeve 85 and the joints 22 and 25 are prevented from opening when inflation medium such as air is introduced into the tubular member 9.

FIG. 16 shows that when that portion of the tubular member 9 that is not confined within the sleeve 85 is inflated, the overlapped joints 22 and 25 slip slightly to enlarge the circumference of the tubular member 9 so that the outer peripheral surface 90 of the tubular member 9 conforms to the inner peripheral surface 92 of the curing chamber 12. This slip of the folded web joint 22, for example, may be as little as three-eights of an inch when curing a 4-inch diameter hose having a 3 inch overlapped joint.

The first tubular hose portion of the hose length formed is cured for a specific period of time and at a specific temperature with the exact time and temperature depending upon conditions such as the thickness of the hose wall and the type of flexible polymeric material of which the hose inner and outer layers are made. For example, a water discharge hose having a wall thickness of about three-sixteenths of an inch and an inner layer of styrene butadiene and an outer layer of a blend of nitrile rubber and polyvinyl chloride is cured for 20 minutes at 320°F.

At the same time the first portion of hose is being cured, a second tubular portion is being formed on the table 8 adjacent to the entrance of the curing apparatus 10. After the first portion of the tubular member 9 is cured the inflated tubular member 9 is cooled by purging the steam from the heated curing chamber 12 and introducing a cooling medium into the curing chamber. Then the tubular member 9 is deflated by evacuating the inflation medium by means of the pipe 15. The extending portion of the tubular member 9 is severed and the coupling 89 is removed. As partially shown in broken lines in FIG. 1, the cured hose portion is advanced out of the curing chamber 12 and the second portion now formed into another elongated tubular hose member 9 is advanced into the curing apparatus 10 and the severed end of the first hose portion is connected onto a coupling member 93 attached to the inflation means provided on the hose reel 14. The hose portions can now be advanced by means of the motorized reel 14 without the use of the connecting ropes. The steps of the invention are then repeated until the entire hose length is cured to form a unitary composite structure (as shown in FIGS. 26–30 inclusive). The cured hose, after being deflated by means of the pipe 15, is normally wound or coiled on the hose reel 14.

FIG. 17 shows an alternate form of the invention in which the tubular member 9 is confined directly within the inner peripheral surface 94 of the confining chamber 11 and is also externally sealed within this chamber. The seal is created by a flexible inflatable means disposed within the chamber 11 that seals the tubular member 9 by an action which presses the wall of the tubular member 9 together against an arcuate portion of the inner peripheral surface 94 of the chamber 11 to close the end of the uncured length thereof. The flexible inflatable means is, for example, an air bag 95 which is inflated by means of an air pipe 96. As shown in FIG. 18, a portion of the tubular member 9 is confined within the chamber 11 with the outer peripheral surface 90 of the tubular member 9 upon inflation thereof, being forced against the inner peripheral surface 94 of the chamber 11. In this way, the circumference of the tubular member 9 is enlarged and the outer peripheral surface 90 of the tubular member 9 is simultaneously confined exteriorly of the curing chamber 12 prior to curing. The remainder of the tubular member 9 is cured by also having its circumference enlarged so that the outer peripheral surface 90 of the tubular member 9 conforms to the inner peripheral surface 92 of the curing chamber 12.

In FIGS. 19–22 inclusive, alternate means for sealing the end of the uncured length of the tubular member 9 externally thereof is shown. In FIGS. 19 and 20 a mechanical clamping or sealing means 97 is used which comprises a metal shoe 98 mounted in a portion of the chamber 11. The shoe 98 is of convex curvature shaped to conform to the arcuate configuration of the inner peripheral surface 94 of the chamber 11 and includes a layer or facing 99 of flexible resilient material which bears against the tubular member 9 to provide sealing contact. In operation, the shoe 98 is extended to contact the tubular member 9 and presses it against an arcuate portion of the inner peripheral surface 94 of the cooling chamber 11. The tubular member 9 is then confined within the inner peripheral surface 94 of the cooling chamber 11 and cured in the same manner as described with references to FIGS. 17 and 18 by having its outer peripheral surface 90 conformed to the inner peripheral surface 92 of the curing chamber 12.

In FIG. 21 and 22 a diaphragm or bellows 100 is used for this same purpose and includes a cylindrical metal container 101 into which is disposed a toroidal shaped flexible resilient inflatable member 102. The inflatable member 102 is pneumatically actuated and when inflated, forces the wall of the tubular member 9 against the inner peripheral surface 94 of the chamber 11 in order to provide the seal. As described previously in the discussion of FIGS. 17–20 inclusive, upon inflation a portion of the outer peripheral surface of the tubular member 9 is again confined within the confining chamber 11 exteriorly of the curing chamber 10 prior to curing as it is forced against the inner peripheral surface 94 of the chamber 11. At the same time, the remaining longitudinally extending portion of the outer peripheral surface 90 of the tubular member 9 is cured as it is forced against the inner peripheral surface 92 of the curing chamber 12.

Tubular members of the type which do not include an extruded tube 5, for example as shown in FIGS. 11–13 inclusive, may also be sealed internally thereof by a flexible pneumatic means disposed within the portion of the tubular member 60 which is positioned within the confining chamber 11. As shown in FIG. 23, this means can be in the form of a flexible air bag 103 which is inflated by the air pipe 104. It should be noticed at this point that this means of inflation would be impractical if the tubular member included an extruded tube of long length since the pipe 104 would be required to be of the same length as the tube in order to function properly. Upon inflation, the bag 103 forces the tubular member 60 into contact with the inner peripheral surface 94 of the chamber 11 thereby creating a seal at the end of the uncured length of the tubular member 60. In this embodiment of the invention, the outer peripheral surface 105 of the tubular member 60 is again contained or confined within and is forced against the inner peripheral surface 94 of the confining or cooling chamber 11 exteriorly of the curing chamber 12 prior to curing to prevent its opening under the internal pressure of inflation.

Other means of internally sealing the tubular members 60 are shown in FIGS. 24 and 25. In FIG. 24, flexible air bags 106 and 107 are placed within the chambers 11 and 13 respectively of the apparatus 10 and inflated by means of the pipes 108 and 109 respectively. The tubular member 60 is inflated by means of the pipe 110 and as a result, the circumference of the tubular member is enlarged. A portion of the tubular member 60 is confined exteriorly of the curing chamber 12 prior to curing by the inner peripheral surfaces 94 of the chambers 11 and 13 and the overlapped joints in the folded web and cover are prevented from opening under conditions of inflation. The inflatable bags 106 and 107 provide a means for sealing both ends of the tubular member 60 during the curing operation.

In FIG. 25, a flexible inflatable means in the form of a flexible elongated air bag 111 extending substantially the entire length of the curing apparatus 10 is disposed within the curing apparatus and the tubular member 60 is moved into the curing apparatus over and around the bag so that the elongated inflatable bag 111 is positioned within the tubular member 60. Upon inflation of the elongated bag 111 by means of the pipe 112, both ends of the tubular member 60 are sealed internally thereof and at the same time, the tubular member 60 is forced outwardly enlarging its circumference. In this way, prior to curing, portions of the tubular member 60 are confined exteriorly of the curing chamber 12 within the inner peripheral surfaces 94 of the chambers 11 and 13 at each end of the curing chamber 12. This alternate form of the invention differs from the previous means of sealing, inflating and confining the hose portions in that the inflation medium is not introduced directly into the tubular member 60 but rather the air bag 111 is inflated and forces the wall of the tubular member outwardly against the inner peripheral surface 92 of the curing chamber 12.

FIGS. 26–30 inclusive illustrate cross-sectional views of the various cured hose of the invention. FIG. 26 illustrates the cured hose 113 made by the method of this invention from the hose components 5, 6 and 7 shown in FIGS. 2, 4 and 5. The hose 113 has an outer layer 114 of flexible polymeric material, an inner layer 115 of flexible polymeric material and includes therebetween a reinforcing section 116 including one circumferentially discontinuous or non-endless overlapped layer or ply 117 of reinforcing material. FIG. 27 illustrates a cured hose 118 of the balance symmetrically reinforced construction referred to in reference to FIG. 8. This hose also includes outer and inner layers 119 and 120 respectively of flexible polymeric material and a circumferentially discontinuous overlapped layer or ply 121 of reinforcing material. FIGS. 28 and 29 represent the cured hose resulting from the methods as described and shown with relation to FIGS. 7 and 9 respectively in which the hose 122 and 123 include outer layers 124 and 125 and inner layers 126 and 127 of flexible polymeric material and the reinforcing section includes two layers or plies 128, 129 and 130, 131 of circumferentially discontinuous overlapped reinforcement respectively. FIG. 30 illustrates the cured hose 132 resulting from the method as described and shown with relation to FIG. 12 in which the hose includes an outer layer 133, an inner layer 134 and a circumferentially discontinuous, overlapped reinforcing layer 135.

It should be apparent to those skilled in the art that the method and apparatus of the present invention provides long length hose having one or more layers of circumferentially discontinuous, overlapped reinforcement economically produced. It should also be apparent that according to the teachings of the present invention, hose of virtually any desired length may be produced without the use of splices or couplings.

While certain representative embodiments and details have been shown for the purpose of illustrating the invention, it will be apparent to those skilled in the art that various changes and modifications may be made therein without departing from the spirit or scope of the invention.

We claim:

1. An apparatus for making flexible reinforced hose in long lengths, said hose having at least an inner layer of flexible polymeric material and a reinforcing section consisting of one or more circumferentially discontinuous layers of reinforcing material surrounding the inner layer and having at least one overlapped joint therein extending longitudinally, of the hose, said apparatus comprising in combination:
   A. an elongated hollow tubular curing apparatus including an elongated curing chamber for curing the hose;
   B. means adjacent to the entrance of said curing apparatus for carrying and supporting at least one web of reinforcing material to form the reinforcing layers of the hose, and a layer of flexible polymeric material to form the inner layer of at least a portion of the hose, said web being folded to form an elongated tubular member with at least one overlapped joint of substantial width extending longitudinally thereof, said tubular member comprising at least a portion of the hose to be made;
   C. flexible confining means disposed in confronting relationship to the entrance of said curing apparatus with at least a portion thereof disposed externally of said curing apparatus;
   D. means acting on the forward end of said tubular member for moving said tubular member including said inner layer of flexible polymeric material through said flexible confining means and then into said curing apparatus to cure a length of said tubular member, and thereby position an uncured length of said tubular member within said flexible confining means to confine an uncured length of said tubular member exteriorly of said curing chamber prior to curing to substantially enclose the outer periphery of the uncured length of said tubular member so as to prevent opening thereof under conditions of inflation;
   E. means for inflating said tubular member prior to curing including means for externally sealing the end of an uncured length of said tubular member which is positioned in the portion of said flexible confining means disposed externally of the curing apparatus, means for sealing the forward end of the cured length of said tubular member, and means for introducing an inflation medium directly into said tubular member through the forward end of the cured length of said tubular member to cause the outer peripheral surface of said tubular member to conform to the inner peripheral surface of said curing chamber;
   F. means for cooling the cured length of said tubular member after curing;
   G. means for deflating said tubular member; and
   H. means acting on the cured end of said tubular member for advancing the cured tubular member out of said curing apparatus.

2. The apparatus as claimed in claim 1 wherein said curing apparatus also includes a confining chamber at the entrance of said apparatus adjacent to the curing chamber.

3. The apparatus as claimed in claim 2 wherein said curing apparatus also includes a confining chamber at the exit of said apparatus adjacent to said curing chamber on the opposite side thereof from said first-mentioned confining chamber.

4. The apparatus as claimed in claim 2 wherein said flexible confining means for confining said tubular member is a flexible sleeve and a length of said sleeve is disposed in said confining chamber spaced from said curing chamber.

5. The apparatus as claimed in claim 4 wherein said sleeve has a greater inner diameter than the outer diameter of said tubular member and has an inner circumference less than the circumference of said chamber so that when the portion of said tubular member that is not confined within said sleeve is inflated the overlapped joint slips slightly to enlarge the circumference of said tubular member so that the tubular member conforms to the inner peripheral surface of said chamber.

6. The apparatus as claimed in claim 4 wherein the means for sealing the end of the uncured length of said tubular member is a clamping member spaced from the entrance of said curing apparatus which provides a seal by compressing the tubular wall of the sleeve and the tubular member contained therein together.

7. The apparatus as claimed in claim 6 wherein said sleeve is comprised of fabric-reinforced vulcanized elastomeric material.

8. The apparatus as claimed in claim 1 wherein said apparatus further includes means spaced from the entrance of said curing apparatus for folding at least one said web.

9. The apparatus as claimed in claim 1 wherein said apparatus further includes means spaced from the entrance of said curing apparatus for carrying at least one continuous sheet of flexible polymeric material and means spaced from the entrance of said curing apparatus for applying said sheet to at least one face of said web.

10. The apparatus as claimed in claim 9 wherein said apparatus includes means for carrying a tube of flexible polymeric material which is applied to one face of said web by wrapping said web around said tube, said tube after curing defining the inner peripheral surface of the hose and means for carrying a sheet of flexible polymeric material which is applied to the opposite face of said web by being folded around said web to form a layer with an overlapped joint extending longitudinally of said tubular member, said layer after curing defining the outer peripheral surface of the hose.

11. The apparatus as claimed in claim 1 wherein said means for sealing said end of the uncured length of said tubular member is a clamping member spaced from the entrance of said curing apparatus.

12. The apparatus as claimed in claim 1 wherein said flexible confining means for confining said tubular member is a flexible sleeve disposed in said curing apparatus and extending outwardly from the entrance thereof.

* * * * *